United States Patent
Ortmann et al.

(10) Patent No.: US 9,073,547 B1
(45) Date of Patent: Jul. 7, 2015

(54) ENTERING AND EXITING PARALLEL OPERATION OF A POWERSPLIT HYBRID POWERTRAIN

(71) Applicant: FORD GLOBAL TECHNOLOGIES, LLC, Dearborn, MI (US)

(72) Inventors: Walter J. Ortmann, Saline, MI (US); Bernard D. Nefcy, Novi, MI (US); Daniel S. Colvin, Farmington Hills, MI (US); Marvin P. Kraska, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/284,601

(22) Filed: May 22, 2014

(51) Int. Cl.
*B60W 20/00* (2006.01)
*B60K 6/442* (2007.10)
*B60K 6/383* (2007.10)
*B60W 10/02* (2006.01)

(52) U.S. Cl.
CPC .............. *B60W 20/20* (2013.01); *B60K 6/442* (2013.01); *B60K 6/383* (2013.01); *B60W 10/02* (2013.01); *Y10S 903/946* (2013.01)

(58) Field of Classification Search
USPC .......................................................... 701/22
See application file for complete search history.

(56) References Cited

U.S. PATENT DOCUMENTS

| | | | |
|---|---|---|---|
| 4,507,985 A | 4/1985 | Morimoto et al. | |
| 6,553,287 B1 * | 4/2003 | Supina et al. | 701/22 |
| 6,688,411 B2 * | 2/2004 | Boggs et al. | 180/65.235 |
| 6,834,750 B2 | 12/2004 | Baker et al. | |
| 7,104,347 B2 * | 9/2006 | Severinsky et al. | 180/65.23 |
| 7,285,869 B2 * | 10/2007 | Syed et al. | 290/40 C |
| 8,056,660 B2 * | 11/2011 | Imura et al. | 180/65.24 |
| 8,317,648 B2 | 11/2012 | Robinette et al. | |
| 8,370,034 B2 | 2/2013 | Kumazaki et al. | |
| 8,409,053 B2 | 4/2013 | Samie et al. | |
| 8,425,377 B2 | 4/2013 | Liang et al. | |
| 8,566,013 B2 * | 10/2013 | Davis et al. | 701/123 |
| 2006/0021811 A1 * | 2/2006 | Kuang et al. | 180/65.3 |
| 2006/0022469 A1 * | 2/2006 | Syed et al. | 290/40 C |
| 2008/0215201 A1 * | 9/2008 | Okubo et al. | 701/22 |
| 2009/0288895 A1 * | 11/2009 | Klemen et al. | 180/65.25 |
| 2010/0025131 A1 * | 2/2010 | Gloceri et al. | 180/65.28 |
| 2010/0063704 A1 * | 3/2010 | Okubo et al. | 701/99 |
| 2011/0172867 A1 * | 7/2011 | Yu et al. | 701/22 |
| 2012/0241274 A1 | 9/2012 | Lloyd | |
| 2013/0006455 A1 * | 1/2013 | Li | 701/22 |
| 2014/0012443 A1 * | 1/2014 | Bolenbaugh | 701/22 |

* cited by examiner

*Primary Examiner* — Thomas Tarcza
*Assistant Examiner* — Alex C Dunn
(74) *Attorney, Agent, or Firm* — David B. Kelley; MacMillian, Sobanski & Todd, LLC

(57) ABSTRACT

A generator brake is controlled such that a powersplit hybrid powertrain enters and exits a parallel mode of operation. The generator brake may be an electrically controlled one-way clutch. The one-way clutch is controlled as a function of an acceleration request to determine whether the parallel mode is to be entered or exited.

20 Claims, 4 Drawing Sheets

ENTERING AND EXITING PARALLEL OPERATION OF A POWERSPLIT HYBRID POWERTRAIN

BACKGROUND OF INVENTION

The present invention relates to a method of controlling an automotive powertrain and in particular to entering and exiting a parallel mode of operation for a powersplit powertrain.

An automotive vehicle may use a powersplit hybrid electric powertrain. Included in the powersplit powertrain is an electric generator, which may also alternatively operate as an electric motor. The powersplit powertrain may be operated in a plurality of modes, including negative powersplit, positive powersplit, and parallel modes. In the positive powersplit mode the generator charges a battery. In the negative powersplit mode the generator operates as a traction motor producing a torque to propel the vehicle. In the parallel mode the generator is braked from rotating, which allows the vehicle to be propelled by a combined torque produced by the engine and a second electric motor. A clutch may be used to brake the generator so that the powertrain may operate in the parallel mode.

However, entering the parallel mode requires the clutch to brake the generator from rotating and exiting the parallel mode requires the clutch to release the generator to rotate.

SUMMARY OF INVENTION

An embodiment contemplates a method of controlling a powersplit hybrid vehicle powertrain. An acceleration command is received for a vehicle. A parallel mode of operating an electric motor, a generator, and an engine is determined to be needed to meet the received acceleration command. A selectively actuatable one-way clutch, rotationally fixed to the generator to prevent rotation in an engagement direction, is electronically actuated to enter the parallel mode.

Another embodiment contemplates a method of controlling a powersplit hybrid vehicle powertrain of a vehicle. An electric motor, a generator, and an engine are operated in a parallel mode when an acceleration command for the vehicle is received. The parallel mode is determined to not be required to meet the received acceleration command. When the parallel mode is determined to not be required, the parallel mode is exited by electronically deactivating a selectively actuatable one-way clutch coupled to the generator to allow for generator rotation in first and second, opposite, directions.

An advantage of an embodiment is providing a control methodology for the one-way clutch. This improves operation of the powertrain when entering and exiting the parallel mode.

DETAILED DESCRIPTION

Figure 1:
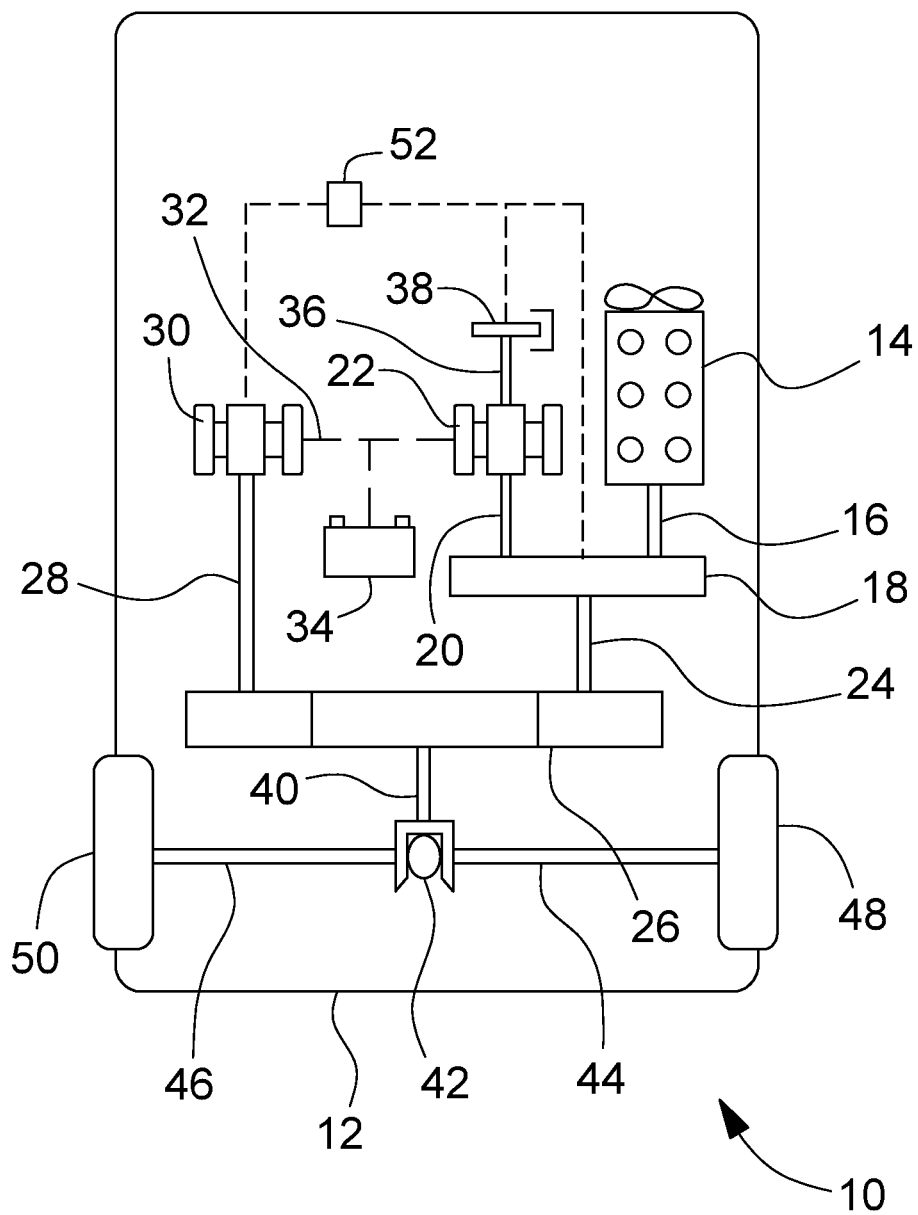
FIG. 1 is a schematic view of a hybrid electric powertrain.

FIG. 1 schematically illustrates a powersplit type hybrid electric powertrain 10 for an automotive vehicle 12. The powertrain 10 is merely exemplary, and may take other forms, such as front wheel drive, rear wheel drive, and all wheel drive types of powertrains.

The powertrain 10 includes an internal combustion engine 14 powering a crankshaft 16. The crankshaft 16 transmits torque from the engine 14 to a planetary gear set 18. Also connected to transmit torque to and from the planetary gear set 18, via a generator shaft 20, is a generator 22. The planetary gear set 18 comprises a sun gear, ring gear, and carrier assembly, which can be conventional and so the specifics of this gear set are omitted from FIG. 1 for clarity. The crankshaft 16 connects to the carrier assembly and the generator shaft 20 connects to the sun gear. The ring gear transmits torque, via a first gearing input 24, to a gearing 26. Also connected to the gearing 26, via a second gearing input 28, is an electric motor 30. The generator 22 and the motor 30 are connected via a high voltage bus 32 to a battery 34. The generator 22 is also connected via a brake shaft 36 to a selectively actuatable one-way clutch (OWC) 38. The gearing 26 transmits torque via a gearing output 40 to a differential 42. The differential 42 transmits torque, via first and second axles 44 and 46, respectively, to rotate first and second wheels 48 and 50, respectively. Operation of the powertrain 10, including the engine 14, generator 22, motor 30, and one-way clutch 38, is controlled by a controller 52. The controller 52 may be a vehicle speed controller (VSC), which controls the powertrain 10 to regulate a speed of the vehicle 12.

As described, the powertrain 10 may operate in a positive powersplit mode in which the generator 22 operates to charge the battery 34. Alternatively, the powertrain 10 may operate in a negative powersplit or parallel mode. In the negative powersplit mode the generator 22 is powered by the battery 34 to rotate and produce a generator torque that propels the vehicle 12. The powertrain 10 operates in a parallel mode when the one-way clutch 38 brakes the generator 22 from rotating. Once braked from rotating, the generator 22 may be turned off. In the parallel mode, torque is supplied to the gearing 26 from the engine 14 and the motor 30. The parallel mode allows both the engine 14 and the motor 30 to propel the vehicle 12.

Figure 2:
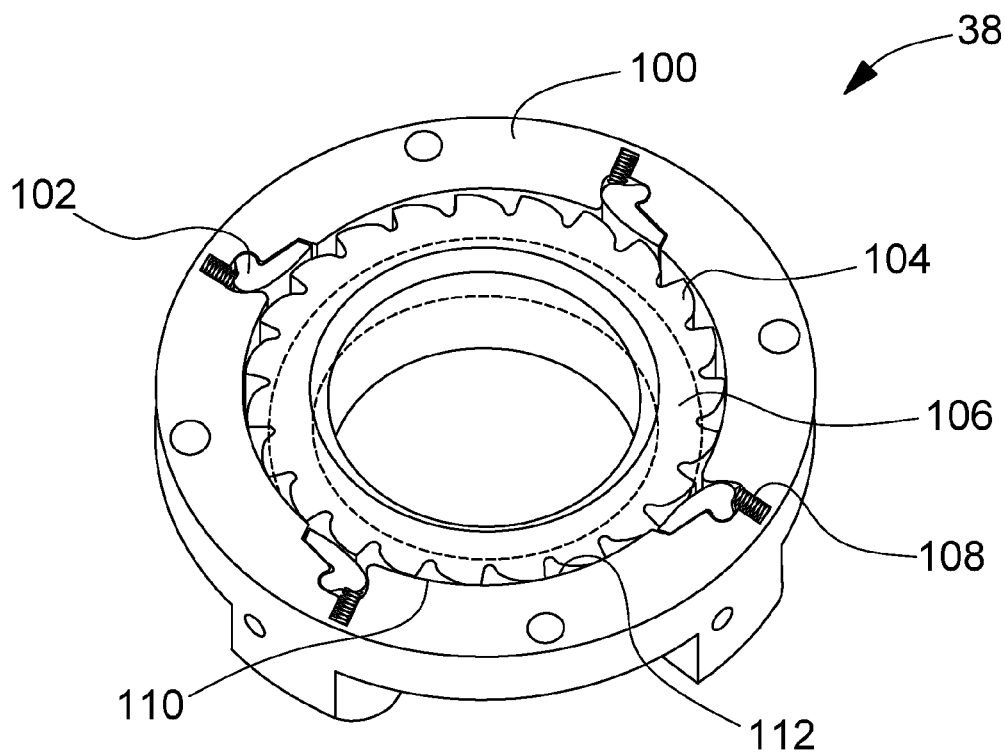
FIG. 2 is a schematic, perspective view of a one-way clutch.

FIG. 2 illustrates the one-way clutch 38. The one-way clutch 38 comprises a rocker plate 100 having pockets 108 that each contain a corresponding rocker 102, which are pivotally hinged within the pockets 108. The clutch 38 also includes a cam plate 104, which has a plurality of notches 112 that define teeth. The teeth can selectively catch fingers extending from the rockers when the rockers 102 are pivoted to extend the fingers radially inward. The rocker plate 100 is connected to and rotates with the brake shaft 36, and the cam plate 104 is secured to the vehicle 12 to prevent rotation of the cam plate 104. For example, the cam plate 104 may be bolted to a casing for the clutch 38.

Figure 3:
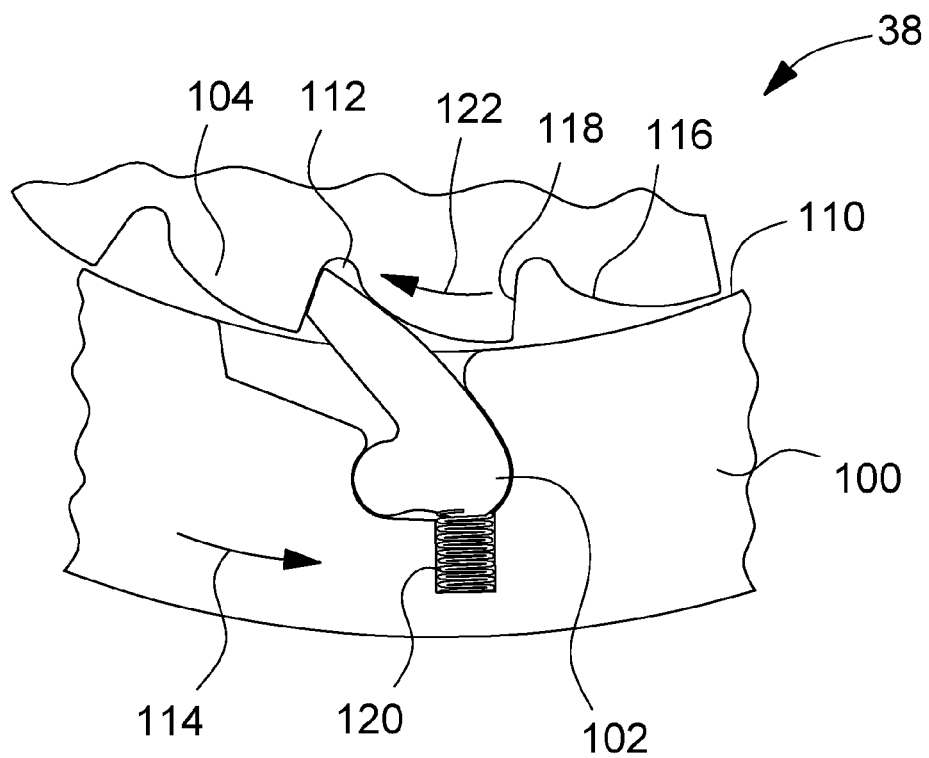
FIG. 3 is a schematic view of a portion of the one-way clutch.

The cam plate 104 contains a coil 106 that may be selectively electrified to produce a magnetic force. As illustrated in FIG. 2, the clutch 38 is in a deactivated state, in which the fingers of the rockers 102 are pivoted to a radially outer position in the rocker plate recesses and thus the fingers do not engage the teeth of the cam plate 104. When the clutch 38 is in the deactivated state, the rockers 102 fit within the pockets 108 without protruding beyond a radially inside face 110 of the rocker plate 100. The rockers are biased by a spring 120 to remain within the pockets 108 without protruding (a bias in a counterclockwise direction as illustrated in FIGS. 2 and 3). When the clutch 38 is deactivated (i.e., the coil 106 is not electrified), no torque is transferred between the rocker and cam plates 100 and 104, respectively. The clutch 38 is activated by electrifying the coil 106. The magnetic force that results from electrifying the coil 106 pivots the fingers of the rockers 102 out of the pockets 108, against the bias of the spring 120, such that the fingers protrude beyond the radially inside face 110 of the rocker plate 100.

As understood by one skilled in the art, the rockers 102 may alternatively be hinged from the cam plate 104, the pockets 108 correspondingly located in the cam plate 104, the notches 112 located in the rocker plate 100, and the coil 106 located in the rocker plate 100.

FIG. 3 illustrates the clutch 38 in an activated state. The fingers of the rockers 102 extend beyond the inside surface 110 of the rocker plate 100 and are pivotally biased towards the notch 112 of the cam plate 104. As discussed, the clutch 38 is a selectively actuatable one-way clutch. When the clutch 38 is activated and the rocker plate 100 rotates in a disengagement direction 114, the fingers of the rockers 102 will be cammed outward by the teeth and so will not engage with the teeth to prevent rotation. Rather, as the rocker plate 100 rotates, a plurality of first cam surfaces 116 deflect the fingers of the rockers 102 toward the pockets 108.

Alternatively, when the clutch 38 is activated and the rocker plate 100 attempts to rotate in an engagement direction 122, opposite the disengagement direction 114, the fingers of the rockers 102 engage with a second engagement surface 118 of the teeth and the clutch 38 is engaged. The mechanical engagement between the cam and rocker plates 104 and 100, respectively, prevents rotation of the rocker plate 100. The mechanical engagement is sufficient such that, if the coil 106 of the clutch 38 is deactivated, the clutch 38 remains engaged to prevent rotation. De-energizing the coil 106 once the clutch 38 is engaged, which deactivates the rockers 102, reduces discharge of the battery 34 while still preventing rotation of the rocker plate 100. Since the rocker plate 100 is rotationally fixed to the generator 22, braking the rocker plate 100 from rotating also prevents the generator 22 from rotating.

Rotation of the rocker plate 100 may be changed from the disengagement direction 114 to the engagement direction 122 by slowing rotation in the disengagement direction 114 to a second stop before commencing rotation in the engagement direction 122. Rotation in the engagement direction 122 may then be accelerated from the second stop to the desired speed. Rotation of the rocker plate 100 may be changed from the engagement direction 122 to the disengagement direction 114 by slowing rotation in the engagement direction 122 to a stop before commencing rotation in the disengagement direction 114. Similarly, rotation in the disengagement direction 114 may then be accelerated from the stop to a desired speed. A time period between stopping and commencing rotation of the rocker plate 100 may vary and may be minimized so as to be imperceptible to a driver of the vehicle 12.

The engaged clutch 38 may be disengaged by rotating the rocker plate 100 in the disengagement direction 114. With or without the coil 106 of the clutch 38 being activated, when the rocker plate 100 is rotated in the disengagement direction 114, no engagement occurs between the rocker and cam plates 100 and 104, respectively, thus allowing the rocker plate 100 to freely rotate. When the coil 106 of the clutch 38 is deactivated, allowing the springs to pivot the fingers away from engagement with the teeth, the rocker plate 100 may be freely rotated in the disengagement direction 114 and engagement direction 122.

Figure 4A:
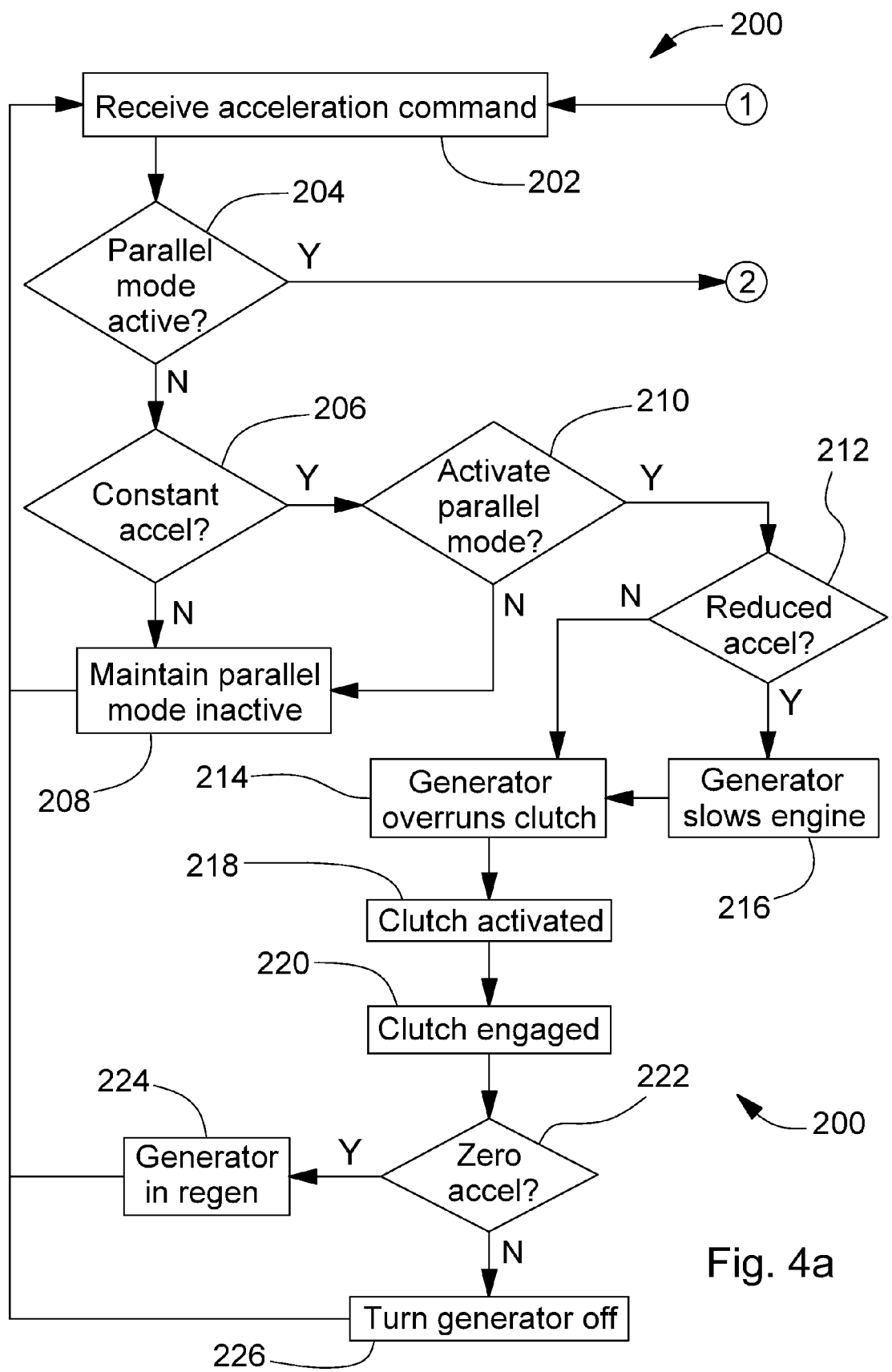
FIGS. 4A and 4B are a flow chart of a control routine for a hybrid electric powertrain.
Figure 4B:
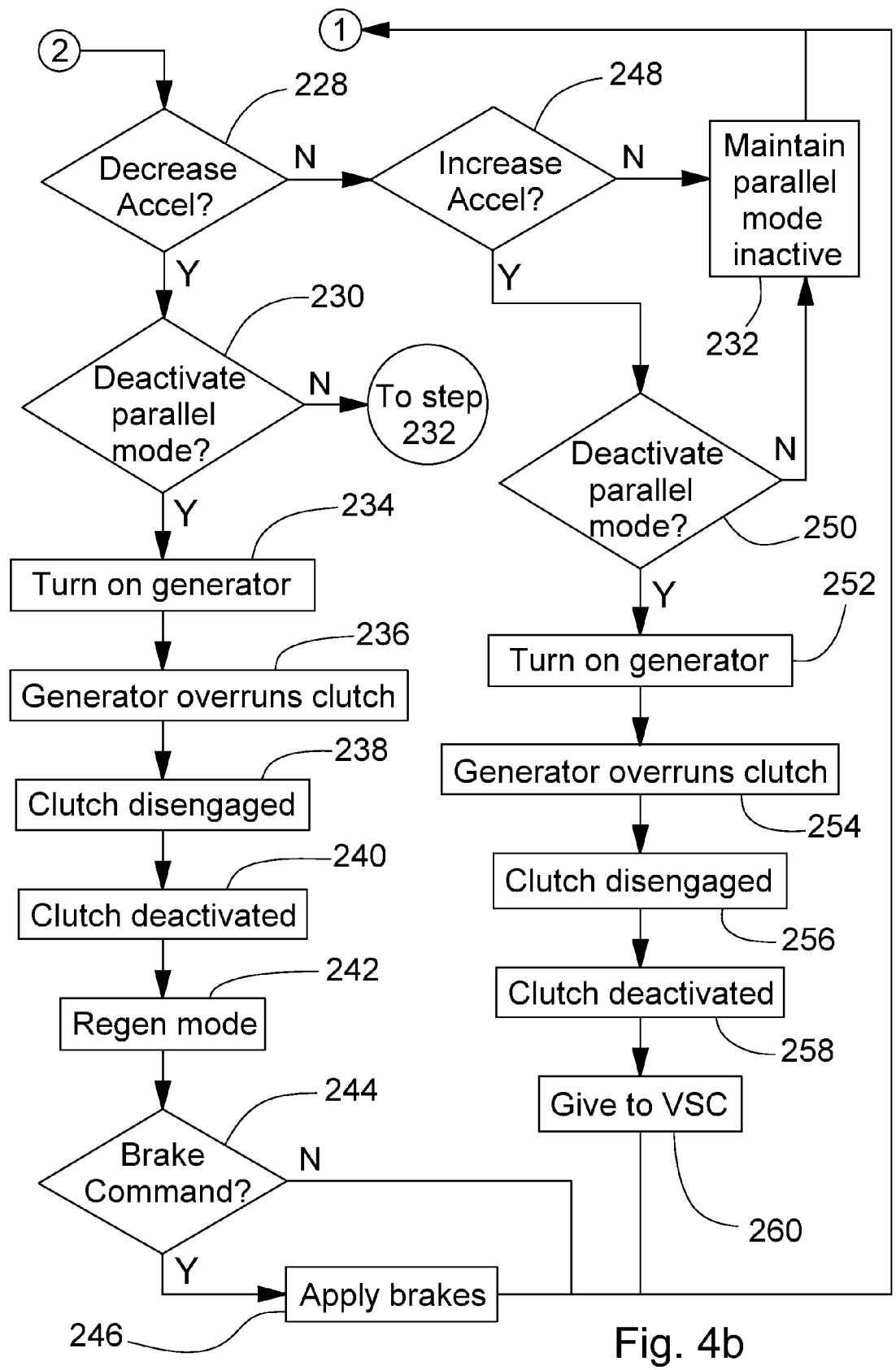

FIGS. 4A and 4B will now be discussed with reference to FIGS. 1-3. FIGS. 4A and 4B illustrate a control routine 200 for the clutch 38 when the powertrain 10 enters and exits the parallel mode.

In a step 202 an acceleration command is received, and whether the parallel mode is active is determined in a step 204. When the parallel mode is inactive, the control routine 200 proceeds to a step 206. Otherwise, when the parallel mode is active, the control routine 200 proceeds to a step 228.

In the step 206, the control routine 200 determines whether the acceleration command is a constant acceleration command. For example, a constant acceleration command may be made when the driver is accelerating the vehicle 12. If the acceleration command is not the constant acceleration command, then in a step 208, the parallel mode remains inactive and the control routine 200 returns to the step 202. If the acceleration command is the constant acceleration command, then in a step 210, whether the parallel mode should be activated is determined. The parallel mode may need to be activated when a required torque to meet the acceleration command exceeds an available torque produced by the powertrain 10 with the parallel mode inactive. If the parallel mode is not needed to meet the acceleration command, then the control routine 200 maintains the parallel mode inactive in the step 208 before returning to the step 202.

If the parallel mode is to be activated, then in a step 212, the control routine 200 determines whether the constant acceleration command has been altered to a reduced acceleration command. For example, the reduced acceleration command may be made once the vehicle 12 reaches a cruising speed to maintain the cruising speed. The reduced acceleration command is less than the constant acceleration command but greater than a zero acceleration command. If the constant acceleration command has not been altered to the reduced acceleration command, then the control routine 200 proceeds to a step 214. Otherwise, if the constant acceleration command has been altered to the reduced acceleration command, then in a step 216 the generator 22 rotates to slow the engine 14, via the planetary gear set 18, before the control routine 200 proceeds to the step 214. For example, the engine 14 may be slowed by the generator 22 rotating in the engagement direction 122.

In the step 214 the generator 22 is commanded to overrun the clutch 38 by rotating the rocker plate 100 in the disengagement direction 114. In a step 218, while the generator 22 is overrunning the clutch 38, the clutch 38 is activated by electrifying the coil 106. As discussed, when the clutch 38 is activated, the rockers 102 pivot, causing the fingers to protrude beyond the inside surface 110. The clutch 38 is then engaged in a step 220 by rotating the rocker plate 100 a short distance in the engagement direction 122, which mechanically engages the rockers 102 with the second engagement surfaces 118 of the teeth. Once the clutch 38 is engaged, torque being carried by the generator 22, from the engine 14, is smoothly transferred to the clutch 38 until the generator 22 is carrying no torque.

In a step 222, the control routine 200 determines whether the acceleration command has been altered to the zero acceleration command. If the acceleration command has been altered to the zero acceleration command, then in a step 224 the generator 22 is operated in a regenerative mode. In the regenerative mode, as understood by one skilled in the art, the generator 22 operates to brake the vehicle 12 while charging the battery 34. Following operating the generator 22 in the regenerative mode, the control routine 200 returns to the step 202. If the acceleration command is not altered to the zero acceleration command, then the generator 22 is turned off in the step 226 before the control routine 200 returns to the step 202. Prior to turning off the generator 22, in the step 220, engine torque carried by the generator 22 has been transferred to the clutch 38. Turning off the generator 22 conserves charge of the battery 34.

As discussed, if the parallel mode is not active in the step 204, the control routine 200 proceeds to the step 228. In the step 228, the control routine 200 determines whether a decreased acceleration command has been made. For example, a decreased acceleration command may be made when the driver desires the vehicle 12 to slow from the cruising speed. If the decreased acceleration command has been made, then in a step 230, the control routine 200 determines whether the parallel mode should be deactivated. The parallel mode may be deactivated when the required torque to meet the acceleration command is available from the powertrain 10 with the parallel mode inactive. If, in the step 230, the parallel mode should remain inactive, then in a step 232 the parallel mode is maintained active and the control routine 200 returns to the step 202. If the parallel mode should be deactivated, then the control routine 200 proceeds to a step 234.

In the step 234, the generator 22 is turned on. The generator 22 may be turned on while the clutch 38 is activated and engaged. In a step 236 the generator 22 is commanded to overrun the clutch 38 by rotating the rocker plate 100 in the disengagement direction 114. In a step 238 the clutch 38 is disengaged when the rockers 102 separate from the second engagement surfaces 118 due to the cam surfaces 116 of the teeth camming the fingers radially outward. In a step 240 the clutch 38 is deactivated while overrunning. In a step 242 the generator 22 operates in the regenerative mode.

In a step 244, the control routine 200 determines if there has also been a brake command. For example, a brake command may be made by the driver when a rapid slowing of the vehicle 12 is desired. If the brake command has been made, then in a step 246 the vehicle 12 is braked. If a magnitude of the braking force required to meet the brake command exceeds a regenerative braking capacity of the generator 22, then additional braking is applied. For example, the additional braking may be from a conventional hydraulic brake system or operating the motor 30 in the regenerative mode. Following braking of the vehicle 12, the control routine 200 returns to the step 202. Otherwise, if the brake command has not been made in the step 244, the control routine 200 proceeds to the step 202.

If, in the step 228, a decreased acceleration command is not received, then in a step 248 the control routine 200 determines whether an increased acceleration command has been received. For example, an increased acceleration command may be made when the driver desires the speed of the vehicle 12 increase from a cruising speed. The increased acceleration command may be the result of the driver increasing the speed of the vehicle 12 or due to an increased road grade or other driving condition that requires the increased acceleration command to maintain the vehicle 12 at a constant speed. If the increased acceleration command is received, then in a step 250 the control routine 200 determines whether to deactivate the parallel mode. If the parallel mode is to remain active, then the control routine 200 continues to the step 202 via the step 232. If the parallel mode is to be deactivated, then the generator 22 is turned on in a step 252, the generator 22 is commanded to overrun the clutch 38 in a step 254, and the clutch 38 is disengaged in a step 256. The generator 22 may be turned on while the clutch 38 is activated and engaged. In a step 258 the clutch 38 is deactivated (de-energizing the coil 106) while overrunning. In a step 260, control of the generator 22 and the clutch 38 are given to the vehicle speed controller before the control routine 200 returns to the step 202. If, in the step 248, the increased acceleration command is not received, then the control routine 200 proceeds to the step 232 before returning to the step 202. If, in the step 250, the control routine 200 decides to keep the parallel mode active, then the control routine 200 proceeds to steps 232 and 202.

While certain embodiments of the present invention have been described in detail, those familiar with the art to which this invention relates will recognize various alternative designs and embodiments for practicing the invention as defined by the following claims.

The invention claimed is:

1. A method of controlling a powersplit hybrid vehicle powertrain comprising:
    electronically actuating a selectively actuatable one-way clutch, rotationally fixed to a generator, to prevent rotation in an engagement direction in order to enter a parallel mode of operating an electric motor, the generator and an engine, based on achieving an acceleration command for a vehicle.

2. The method of claim 1 wherein the acceleration command is a constant rate of acceleration.

3. The method of claim 2 wherein entering the parallel mode comprises the steps of:
    overrunning the clutch by rotating the generator in a disengagement direction;
    electronically activating the clutch while overrunning;
    engaging the activated clutch by rotating the generator in an engagement direction opposite the disengagement direction until the clutch is engaged to prevent further rotation in the engagement direction;
    transferring engine torque carried by the generator to the activated clutch;
    turning off the generator after the engine torque is transferred.

4. The method of claim 1 wherein the acceleration command is a constant rate of acceleration before being reduced.

5. The method of claim 4 wherein entering the parallel mode comprises the steps of:
    slowing the engine by rotating the generator in an engagement direction;
    overrunning the clutch, after slowing the engine, by rotating the generator in a disengagement direction opposite the engagement direction;
    activating the clutch while overrunning;
    engaging the activated clutch by rotating the generator in the engagement direction until the clutch is engaged to prevent further rotation in the engagement direction;
    transferring engine torque carried by the generator to the activated clutch;
    turning off the generator after the engine torque is transferred.

6. The method of claim 1 wherein the acceleration command is a constant rate of acceleration before being reduced to zero acceleration.

7. The method of claim 6 wherein entering the parallel mode comprises the steps of:
    overrunning the clutch by rotating the generator in a disengagement direction;
    activating the clutch while overrunning;
    engaging the activated clutch by rotating the generator in a second direction opposite the disengagement direction until the clutch is engaged to prevent further rotation in the engagement direction;
    rotating the generator in the engagement direction to slow the vehicle and charge a battery.

8. A method of controlling a powersplit hybrid vehicle powertrain of a vehicle comprising:
    operating an electric motor, a generator, and an engine in a parallel mode to achieve an acceleration command for the vehicle;

exiting the parallel mode, when the parallel mode is no longer needed based on a new acceleration command, by electronically deactivating a selectively actuatable one-way clutch coupled to the generator to allow for generator rotation in first and second, opposite, directions.

9. The method of claim 8 wherein the new acceleration command is a decrease to zero acceleration.

10. The method of claim 9 wherein exiting the parallel mode comprises the steps of:
   turning on the generator while the clutch is activated and engaged;
   rotating the generator to overrun and disengage the clutch;
   deactivating the clutch while overrunning.

11. The method of claim 10 comprising the further step of using the generator to charge a battery.

12. The method of claim 8 wherein the new acceleration command is a decrease to zero acceleration accompanied by a braking command.

13. The method of claim 12 wherein exiting the parallel mode comprises the steps of:
   turning on the generator while the clutch is activated and engaged;
   rotating the generator to overrun and disengage the clutch;
   deactivating the clutch while overrunning.

14. The method of claim 12 wherein a magnitude of the braking force to meet the braking command is greater than a regenerative braking capacity produced by rotating the generator to charge a battery.

15. The method of claim 8 wherein the new acceleration command is an increase in acceleration.

16. The method of claim 15 wherein exiting the parallel mode comprises the steps of:
   turning on the generator while the clutch is activated and engaged;
   rotating the generator to overrun and disengage the clutch;
   deactivating the clutch while overrunning.

17. The method of claim 8 wherein the new acceleration command is to maintain a constant rate of acceleration while increasing resistance to the rate of acceleration.

18. The method of claim 17 wherein the increasing resistance is due to an increased driving grade.

19. The method of claim 17 wherein exiting the parallel mode comprises the steps of:
   turning on the generator while the clutch is activated and engaged;
   rotating the generator to overrun and disengage the clutch;
   deactivating the clutch while overrunning.

20. The method of claim 8 wherein exiting the parallel mode comprises the steps of:
   turning on the generator while the clutch is deactivated and engaged;
   rotating the generator to overrun and disengage the clutch.

* * * * *